United States Patent
Lee et al.

(10) Patent No.: US 9,408,082 B2
(45) Date of Patent: *Aug. 2, 2016

(54) METHOD FOR ACQUIRING RESOURCES IN A COEXISTENCE SYSTEM, AND APPARATUS USING SAME

(75) Inventors: Jihyun Lee, Gyeonggi-Do (KR);
Eunsun Kim, Gyeonggi-Do (KR);
Yongho Seok, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 615 days.

This patent is subject to a terminal disclaimer.

(21) Appl. No.: 13/519,684

(22) PCT Filed: Oct. 28, 2011

(86) PCT No.: PCT/KR2011/008139
§ 371 (c)(1),
(2), (4) Date: Oct. 24, 2012

(87) PCT Pub. No.: WO2012/057569
PCT Pub. Date: May 3, 2012

(65) Prior Publication Data
US 2013/0035125 A1 Feb. 7, 2013

Related U.S. Application Data

(60) Provisional application No. 61/408,644, filed on Oct. 31, 2010, provisional application No. 61/421,217, filed on Dec. 9, 2010.

(51) Int. Cl.
*H04B 7/00* (2006.01)
*H04W 16/14* (2009.01)
(Continued)

(52) U.S. Cl.
CPC .......... *H04W 16/14* (2013.01); *H04N 21/2385* (2013.01); *H04W 24/04* (2013.01); *H04W 72/042* (2013.01); *H04W 72/085* (2013.01)

(58) Field of Classification Search
CPC ... H04W 16/14; H04W 24/04; H04W 72/042; H04W 72/085
USPC .......................................................... 455/509
See application file for complete search history.

(56) References Cited

U.S. PATENT DOCUMENTS

2008/0259811 A1* 10/2008 Cordeiro ............... H04W 24/10
370/252
2010/0020732 A1 1/2010 Gaddam et al.
(Continued)

FOREIGN PATENT DOCUMENTS

| KR | 10-2010-0097497 A | 9/2010 |
| KR | 10-2010-0114828 A | 10/2010 |
| WO | WO 2010/114640 A1 | 10/2010 |

OTHER PUBLICATIONS

Jo et al., "IEEE 802.19.1 System Description," IEEE 802.19-10/129r0, Sep. 14, 2010, 9 pages.
(Continued)

*Primary Examiner* — Nay A Maung
*Assistant Examiner* — Maryam Soltanzadeh
(74) *Attorney, Agent, or Firm* — Birch, Stewart, Kolasch & Birch, LLP

(57) ABSTRACT

In a method of receiving one or more resources, an apparatus having a coexistence enabler entity transmits a request message containing information on one or more devices using channels within a TV band to a coexistence manager. Here, the information contains an available channel list obtained from the one or more devices using the channels within the TV band, and the request message further contains one or more of maximum power level, channel load and location information. In the method, the apparatus receives a response message for allocating the resources from the coexistence manager. Here, the response message further contains one or more of information on channel numbers, start frequency, end frequency and maximum power level.

16 Claims, 15 Drawing Sheets

(51) Int. Cl.
*H04N 21/2385* (2011.01)
*H04W 24/04* (2009.01)
*H04W 72/04* (2009.01)
*H04W 72/08* (2009.01)

(56) References Cited

U.S. PATENT DOCUMENTS

| | | | |
|---|---|---|---|
| 2010/0136974 A1* | 6/2010 | Kim et al. | 455/436 |
| 2010/0216480 A1 | 8/2010 | Park et al. | |
| 2011/0090887 A1* | 4/2011 | Kim et al. | 370/338 |
| 2011/0151886 A1* | 6/2011 | Grayson et al. | 455/452.1 |
| 2012/0093092 A1* | 4/2012 | Kasslin et al. | 370/329 |
| 2012/0106461 A1* | 5/2012 | Kasslin et al. | 370/329 |

OTHER PUBLICATIONS

Junell et al., "Proposal on System Description, Reference Model and Draft Outline," IEEE 802.19-10/0127r0, Sep. 13, 2010, 22 pages.

\* cited by examiner (a)

```
COEX_measurement.request (
            DestinationIdentifier
            ChannelNumber
)
```

FIG. 11b

```
COEX_measurement.indication (
            SourceIdentifier
            ChannelNumber
)
```

FIG. 11c

```
COEX_measurement.response (
            DestinationIdentifier
            ResultCode
            Measurement Report Set
)
```

FIG. 11d

```
COEX_measurement. confirm(
            SourceIdentifier
            ResultCode
            Measurement Report Set
)
```

METHOD FOR ACQUIRING RESOURCES IN A COEXISTENCE SYSTEM, AND APPARATUS USING SAME

CROSS REFERENCE TO RELATED APPLICATIONS

This application is the National Phase of PCT/KR2011/008139 filed on Oct. 28, 2011, which claims priority under 35 U.S.C 119(e) to U.S. Provisional Application Nos. 61/408,644 and 61/421,517 filed on Oct. 31, 2010 and Dec. 9, 2010 respectively, all of which are hereby expressly incorporated by reference into the present application.

TECHNICAL FIELD

The present disclosure relates to a method of acquiring resources in a coexistence system and an apparatus using the same.

BACKGROUND ART

Conventionally, frequency allocation for a new service or frequency allocation to a new provider was performed under the leading of the government.

Particularly, when new providers were added to existing providers, frequencies as limited resources were allocated by allocating new frequencies to the new providers through an auction, etc., or by collecting existing frequencies from the existing providers and reallocating the collected frequencies to the new providers.

However, as demands radio data traffic are explosively increased due to the spread of various wireless Internet-based applications such as an open terminal platform, an application (app) store and a mobile VoIP in recent years, the frequency allocation under the leading of the government is very inefficient, and it gradually becomes difficult to secure new frequencies on Frequency Allocation Table.

Particularly, with the rapid development of broadcasting and communication systems, next-generation communication systems are designed in the form of fusion of several networks, and the necessity of interaction gradually increases as the systems are gradually complicated. In addition, the use of frequency resources increases as communication technologies and services are developed, and the problem of the lack of frequencies is serious as specific frequency bands are occupied to provide excellent communication technologies and services.

Recently, attention to a frequency sharing technology has been paid as a plan for solving the problem. The current lack of frequencies results from the existing frequency management technology in which frequencies are partitioned. However, the frequency sharing technology is derived from the viewpoint that although it seems that frequencies are insufficient on the Frequency Allocation Table, the problem of lack of frequencies can be solved through the frequency sharing technology.

As the problem of the lack of frequencies are recognized as an important issue all over the world, the US Federal Communications Commission (FCC) decided to apply a cognitive radio (CR) technology as the frequency sharing technology to TV idle frequencies (whitespaces) so as to improve spectrum use efficiency and to facilitate the introduction of new services, and revised related regulations in November, 2008.

Such a movement is gradually extended, and, in 2009, England permitted the used of a CR-based frequency sharing technology in frequency bands not spatially used, i.e., whitespace bands, among TV broadcasting frequency bands. Currently, EU is also under investigation on a plan for introducing the CR-based frequency sharing technology in the whitespace bands, and preparations for providing a frequency sharing policy using whitespace bands is made in Korea.

The cognitive radio technology refers to a system that allows a communication device to detect communication environment for itself, to determine and select an operational method for optimum communication and to make a plan for future decision from the previous communication experiences. That is, the cognitive radio technology is a technology for searching for idle resources (spectrum holes or whitespaces) which have low utilization or are not temporarily/spatially used from frequency bands allocated in unlicensed bands and adaptively and opportunistically utilizing the searched idle resources. In this case, the cognitive radio technology should be operated not to damage a primary user by immediately stopping the use of a corresponding band or adjusting transmission power when the primary user having a license of the corresponding band is found.

DISCLOSURE OF THE INVENTION

Therefore, an object of the present disclosure is to provide a method of acquiring resources in a coexistence system and an apparatus using the same, in which a channel load is measured, so that it is possible to reduce signaling and computation overhead followed when a coexistence manager performs optimum operating channel allocation while managing all information containing the measurement information.

Another object of the present disclosure is to provide a method of acquiring resources in a coexistence system and an apparatus using the same, in which a coexistence enabler informs a coexistence manager of preference for the operating channel, based on the channel information actually measured by a TVBD network or device, using the channel load, so that it is possible to reduce the overhead followed when the coexistence manager performs the channel allocation.

To achieve these and other advantages and in accordance with the purpose of the present disclosure, as embodied and broadly described herein, there is provided a method of receiving one or more resources, the method including: transmitting, by an apparatus having a coexistence enabler entity, a request message containing information on one or more devices using channels within a TV band to a coexistence manager, wherein the information contains an available channel list obtained from the one or more devices using the channels within the TV band, and the request message further contains one or more of maximum power level, channel load and location information; and receiving, by the apparatus, a response message for allocating the resources from the coexistence manager, wherein the response message further contains one or more of information on channel numbers, start frequency, end frequency and maximum power level.

The method may further include receiving, by the apparatus, a request message from the one or more devices. The request message received from the one or more device may further contain one or more of information on channel numbers, maximum transmission level, channel load and location information.

The method may further include transmitting, by the apparatus, a response message to the one or more devices. The transmitted response message may further contain one or more of information on channel numbers, start frequency, end frequency and maximum power level.

The coexistence manager may generate a coexistence whitespace map, perform coexistence decision for the one or more devices, or exchange information required for coexistence.

The one or more devices using the channels within the TV band may use different network technologies from one another.

To achieve the above aspect of the present disclosure, there is provided a method of allocating one or more resources, the method including: receiving, by an apparatus having a coexistence manager, a request message containing information on one or more devices using channels within a TV band from a coexistence enabler entity, wherein the information contains an available channel list obtained from the one or more devices using the channels within the TV band, and the request message further contains one or more of maximum power level, channel load and location information; and transmitting, by the apparatus, a response message for allocating the resources to the coexistence enabler entity, wherein the response message further contains one or more of information on channel numbers, start frequency, end frequency and maximum power level.

The method may further include transmitting, by the apparatus, a response message for allocating the resources to the coexistence enabler entity. The response message may further contain information on channel numbers, start frequency, end frequency and maximum power level.

To achieve the above aspect of the present disclosure, there is provided an apparatus for allocating one or more resources, the apparatus including: a storage configured to have a coexistence enabler entity; a transmitter configured to transmit a request message containing information on one or more devices using channels within a TV band to a coexistence manager, in cooperation with the coexistence enabler entity, wherein the information contains an available channel list obtained from the one or more devices using the channels within the TV band, and the request message further contains one or more of maximum power level, channel load and location information; and a receiver configured to receive a response message for allocating the resources from the coexistence manager, wherein the response message further contains one or more of information on channel numbers, start frequency, end frequency and maximum power level.

To achieve the above aspect of the present disclosure, there is provided an apparatus for allocating one or more resources, the apparatus including: a storage configured to have a coexistence manager; a receiver configured to receive a request message containing information on one or more devices using channels within a TV band from a coexistence enabler entity, wherein the information contains an available channel list obtained from the one or more devices using the channels within the TV band, and the request message further contains one or more of maximum power level, channel load and location information; and a transmitter configured to transmit a response message for allocating the resources to the coexistence enabler entity, in cooperation with the coexistence manager, wherein the response message further contains one or more of information on channel numbers, start frequency, end frequency and maximum power level.

BRIEF DESCRIPTION OF THE DRAWINGS

FIG. 11(a) illustrates semantics of primitives in a coexistence measurement request according to an embodiment of the present invention;

FIG. 11(b) illustrates semantics of primitives in coexistence measurement identification according to an embodiment of the present invention;

FIG. 11(c) illustrates semantics of primitives in a coexistence measurement response according to an embodiment of the present invention;

FIG. 11(d) illustrates semantics of primitives in a coexistence measurement confirmation according to an embodiment of the present invention;

MODES FOR CARRYING OUT THE PREFERRED EMBODIMENTS

Figure 1:
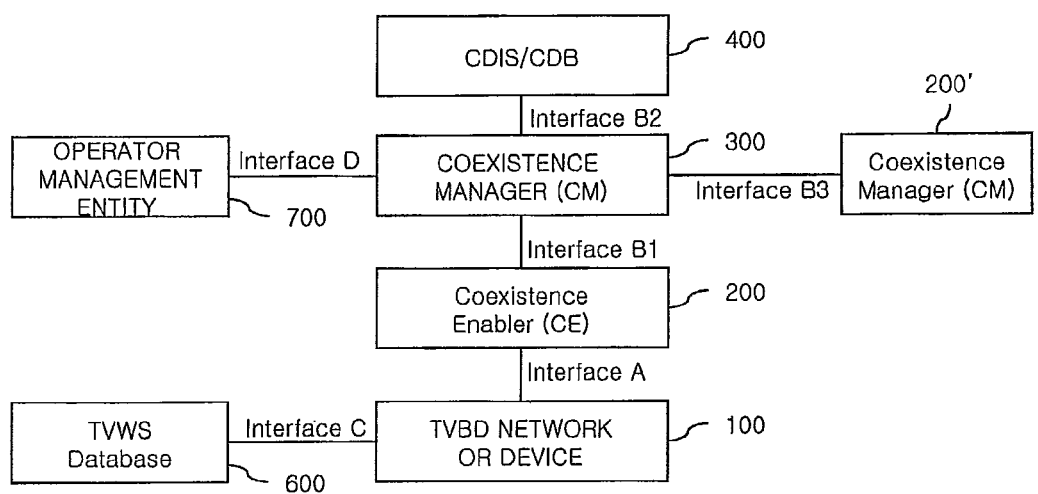
FIG. 1 is a block diagram illustrating a coexistence system according to an embodiment of the present disclosure.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

The terminology used herein is for the purpose of describing particular embodiments only and is not intended to be limiting of the invention. It will be further understood that the terms "includes" and/or "including," when used in this specification, specify the presence of stated features, integers, steps, operations, elements, and/or components, but do not preclude the presence and/or addition of one or more other features, integers, steps, operations, elements, components, and/or groups thereof.

It will be understood that, although the terms "first," "second," etc. may be used herein to describe various elements, these elements should not be limited by these terms. These terms are only used to distinguish one element from another element. Thus, a "first" element discussed below could also be termed as a "second" element without departing from the teachings of the present disclosure.

In the drawings, the thickness of layers, films and regions are exaggerated for clarity. Like numerals refer to like elements throughout.

Reference will now be made in detail to the preferred embodiments of the present disclosure, examples of which are illustrated in the accompanying drawings. It will also be apparent to those skilled in the art that various modifications and variations can be made in the present disclosure without departing from the spirit or scope of the invention. Thus, it is intended that the present disclosure cover modifications and variations of this invention provided they come within the scope of the appended claims and their equivalents.

Description will now be given in detail of a method of acquiring resources in a coexistence system and an apparatus using the same according to an embodiment, with reference to the accompanying drawings.

Hereinafter, the term "terminal" is used, but may be called as a user equipment (UE), mobile equipment (ME), mobile station (MS), user terminal (UT), subscriber station (SS), wireless device, handheld device or access terminal (AT).

IEEE 802.11 wireless local area network (WLAN) standard provides a transmission speed of 11 Mbps (IEEE 802.11b) or 54 Mbps (IEEE 802.11a) using an unlicensed band in 2.4 GHz or 5 GHz.

IEEE 802.11g provides a transmission speed of 54 Mbps by applying orthogonal frequency division multiplexing (OFDM) in 2.4 GHz.

IEEE 802.11n provides a transmission speed of 300 Mbps with respect to four spatial streams by applying multiple-input multiple-output OFDM (MIMO-OFDM). In the IEEE 802.11n, the channel bandwidth is supported up to 40 MHz. In this case, the IEEE 802.11n provides a transmission of 600 Mbps.

TV whitespace includes a VHF band (54 to 60 MHz, 76 to 88 MHz and 174-216 MHz) and a UHF band (470 to 698 MHz), allocated to a broadcast TV system, and refers to a frequency band of which use is permitted to an unlicensed device under the condition that the communication of the unlicensed device does not interrupt the communication of licensed devices (TV broadcasting, wireless microphone, etc.) operating in a corresponding frequency band.

Meanwhile, TVWS is an abbreviation for TV whitespace, and refers to an empty frequency band unused by a broadcasting provider in the VHF and UHF frequency bands distributed for the purpose of TV broadcasting. The TVWS refers to an unlicensed band that can be used by anyone who satisfies conditions for government's radio regulations. That is, the TVWS may mean frequency information for broadcasting. Specifically, the TVWS spatially means a frequency band unused for fear of frequency interference between broadcasting providers, a frequency band unused for each region or a region that radio waves do not cover, and temporarily means a broadcasting frequency unused in a time zone such as dawn, in which the broadcasting providers do not provide broadcasting services. The TVWS must not interrupt the reception of broadcasting services by providing interference to TV watchers who are customers of the broadcasting providers, and must not have influence on a radio microphone device performing communication with small power using a portion of the frequency band.

While operations of all unlicensed devices are allowed, except some specific cases, in the bands of 512 to 608 MHz and 614 to 698 MHz, only communication between fixed devices is allowed in the bands of 54 to 60 MHz, 76 to 88 MHz, 174 to 216 MHz and 470 to 512 MHz. Here, the fixed device refers to a device performing transmission only at a fixed location.

IEEE 802.11 TVWS terminal refers to an unlicensed device that operates in a TV whitespace spectrum using IEEE 802.11 MAC and PHY.

An unlicensed user who desires to use the TV whitespace should provide a protection function for a licensed user. Therefore, the unlicensed user must check whether or not the licensed user occupies a corresponding band before transmission is started in a TV band.

To this end, the unlicensed device must access a geo-location database through the Internet or dedicated network and acquire information on a channel list available in a corresponding region. The geo-location information database is a database that stores and manages information of licensed devices registered to the unlicensed device, location information of the licensed devices and channel use information dynamically changed depending on time used.

A station (STA) performs a spectrum sensing mechanism. An energy detection scheme, a feature detection scheme, etc. are used as the spectrum sensing mechanism. If the strength of a received signal is a certain value or more, or if a DTV preamble is detected, the STA determines that an incumbent user uses a corresponding band. If it is determined the incumbent user uses the corresponding band in a channel immediately adjacent to a currently used channel, the STA and an access point (AP) must decrease transmission power.

FIG. 1 is a block diagram illustrating a coexistence system according to an embodiment of the present disclosure.

As shown in FIG. 1, the coexistence system includes a coexistence enabler (CE) 200, a coexistence manager (CM) 300 and a coexistence discovery and information server (CDIS) or coexistence database (CDB) 400.

The CM 300 and CE 200 are different radio systems operating in an unlicensed state in the TVWS or logical entities defined for the purpose of coexistence between radio providers. The CM 300 is an object that has an interface with a TVWS database and performs resource allocation so as to solve interface problems CEs 200 connected to the CM 300 while providing policies and guidelines related to coexistence for the purposed of the coexistence between the different systems operating in the TVWS and between the providers.

The CE 200 is an object that has an interface with a TV band device (TVBD) network or device 100 and performs a function of transmitting information and command received from the CM 300 to the TVBD network or device 100. In this specification, STAs may perform functions of the CEs 200, and constitute a coexistence network structure in which a management entity such as the CM 300 exists as a high-level object capable of controlling the CEs 200.

The CE 200 receives information or command related to the coexistence from the CM 300. For the purpose of the operation of the TVBD network or device 100, required by a corresponding message, the CE 200 converts the received information or command into media specific information or command and transmits the media specific information or command to the TVBD network or device 100. Similarly, the CE 200 may convert the information received from the TVBD network or device 100 into information in the form of a message defined in the coexistence system, and transmit the converted information to the CM 300. Since the CE 200 is located within the TVBD network or device 100, a service access point (SAP) and primitives between the CE 200 and the management entity of the TVBD network or device 100 must be defined so that a command is transmitted between the CE 200 and the TVBD network or device 100.

The CM 300 may service one or more CEs 200. The CM 300 may obtain required information from an external entity such as the TVWS database or a CE 200 serviced by the CM 300 itself or another CE 300. The CM 300 transmits/receives information or command message to/from another CM 300, or transmits information or command to the CE 200 serviced by the CM 300 itself. The CM 300 performs coexistence decision making based on the obtained information. In this case, the coexistence decision making may include decision of the operation channel and maximum transmission power of the CE 200 serviced by the CM 300, etc.

The TVDB network or device 100 may be a device or network as an unlicensed user using the TV band. For example, the TVBD network or device 100 may be a device such as an access point (AP) or base station (BS), which operated in a master mode. The TVBD network or device 100 may communicate with the CM 300 for the purposed of coexistence while operating in the master mode, and manage/control devices operating in a slave mode.

The CDIS/CDB 400 has an interface with the CM 300, and may obtain information related to a CM 300 serviced by the CDIS/CDB 400 itself and a CE 200 serviced by the corresponding CM 300 from the CM 300 and manage the obtained information, e.g., geo-location of the TVBD network or device 100 serviced by the CE 200, information on a variable channel list obtained by the TVBD network or device 100 from the TVWS database, a measurement result of the TVBD network or device 100, a list of CEs 200 serviced by the CM 300, etc.

The CDIS/CDB 400 may compute a neighbor relationship between the CMs 300 serviced by the CDIS/CDB 400 itself and a neighbor relationship between the CEs 200. That is, when considering a specific TVBD network or device 100, the CDIS/CDB 400 may compute which TVBD network or device 100 is interfered with the corresponding TVBD network or device 100 and which CE 200 and CM 300 service the corresponding TVBD network or device 100.

To use a coexistence service, the CE 200 configures a connection to a CM 300 and registers itself to the corresponding CM 300. The CM 300 necessarily configures connection to neighboring CMs 300. The CM 300 manages CEs 200 registered to the CM 300 itself and provides services for coexistence to the CEs 200. As such, a topology in which the CM 300 performs a coexistence decision making while managing a plurality of CEs 200 is referred to as a centralized topology. Since a decision maker is the CM 300 in the centralized topology, the CE 200 follows the decision making of the CM 300.

Hereinafter, each of the components in the coexistence system will be described in detail.

The CE 200 is connected to the CM 300 through an interface B1, and the CM 300 is connected to the CDIS/CDB 400 through an interface B2. The CM 300 is also connected to another CM 200' through an interface B3.

The CE 200 is connected to the TVBD network or device 100 through an interface A. Here, the TVBD network or device 100 refers to a terminal allowed to use the TVWS in the Federal Communication Commission (FCC). The TVBD network or device 100 may be connected to the TVWS database 600 through an interface C.

The CE 200 may request and obtain information required for coexistence from the TVBD network or device 100. The CE 200 may convert reconfiguration requests/commands and control information, received from the CM 300, into TVBD specific reconfiguration requests/commands, and transmit the TVBD specific reconfiguration requests/commands to the TVBD network or device 100.

The CM 300 may have a function of discovering other CMs so as to solve a coexistence problem between TVBD networks, a coexistence decision making function of generating corresponding coexistence requests/commands and control information and providing the corresponding coexistence requests/commands and control information to the CE 200, and a function of supporting the exchange of information required for coexistence between the CMs (including hierarchical or peer-to-peer decision making capabilities in the placement of the CMs).

The CM 300 may have a function of selecting a representative CM by sharing information on CMs, a function of generating a coexistence whitespace map for efficiently sharing frequency resources between other networks and systems as will be described later, and a function of assisting network operators when management related to TVWS coexistence is performed.

The CM 300 may be implemented in the form in which the CM 300 is embedded in a device such as an AP or BS, or may be implemented at the outside of the device.

The CDIS/CDB 400 may be implemented as a CDIS, CDB, etc. according to its function. The CDIS/CDB 400 may have a function of generating a coexistence whitespace map or coexistence map for efficiently sharing frequency resources between other networks and systems, a function of controlling a plurality of operators when management related to TVWS coexistence is performed, and a function of selecting a representative CM so as to reduce communication overhead between CMs and to solve a coexistence problem.

The CDIS/CDB 400 may perform a function of computing a coexistence contour so as to search for neighboring networks/systems, a function of redirecting the coexistence whitespace map or coexistence map suitable for the TVBD so as to solve the coexistence problem, a function of supporting a search of CMs by promoting the opening of interfaces between the CMs, and a function of collecting, synthesizing and providing information capable of promoting coexistence (including data storage and data processing.

When allocating resources, the CDIS/CDB 400 may omnipotently allocate resources, provides a reference of priority between the CMs 300 as an intermediary and perform tuning for the resource selection of each of the CMs 300, or act as a database between the CMs 300 or an information sharing carrier between networks.

Meanwhile, the interface A is an interface between the CE 200 and the TVBD network or device 100. Information required for coexistence, configuration/information request for coexistence, configuration/measurement/information response for coexistence and other information as occasion demands may be provided from the TVBD network or device 100 to the CE 200 through the interface A. Reconfiguration request/command and control information (corresponding to coexistence request/command received from the CM and control information), request/command related to the control of a measured value, performed by the TVBD network or device 100, information for notifying available resources and other information as occasion demands may be provided from the CE 200 to the TVBD network or device 100 through the interface A.

The Interface B1 is an interface between the CE 200 and the CM 300. Information required for coexistence (information obtained by the TVBD network or device 100) and other information as occasion demands may be provided from the CE 200 to the CM 300 through the interface B1. Coexistence request/command and control information and other information as occasion demands may be provided from the CM 300 to the CE 200 through the interface B1.

The interface B2 is an interface between the CM 300 and the CDIS/CDB 400. Information required for a coexistence map, information required for a neighbor set, information required for registration/unregistration, information required for search (obtained by a currently used CM), information for coexistence (obtained by a currently used CM) and other information as occasion demands may be provided from the CM 300 to the CDIS/CDB 400 through the interface B2.

Information notified for a coexistence map, information notified for a neighbor set (or neighbor list), information notified for a representative CM, information required for search (obtained by another CM), information required for coexistence (obtained by another CM) and other information as occasion demands may be provided from the CDIS/CDB 400 to the CM 300 through the interface B2.

The interface B3 is an interface between the CM 300 and another CM 300'. Information and message required for search and coexistence, information notified for registration/unregistration (from the CM to the representative CM or from the CM of a device to the CM of a server), information notified for a coexistence map (from the CM to the representative CM or from the CM of a device to the CM of a server), information necessary for policy exchange/negotiation and other information as occasion demands may be provided from the CM 300 to the CM 300' through the interface B3.

The interface C is an interface between the TVBD network or device 100 and the TVWS database 600. Information notified for an available channel may be provided from the TVWS database 600 to the TVBD network or device 100 through the interface C.

The interface D is an interface between the CM 300 and an operator management entity (OME) 700. Network operation information (e.g., a restricting factor related to the operation of a spectrum policy/network) and other information as occasion demands may be provided from the OME 700 to the CM 300 through the interface D.

Figure 2:
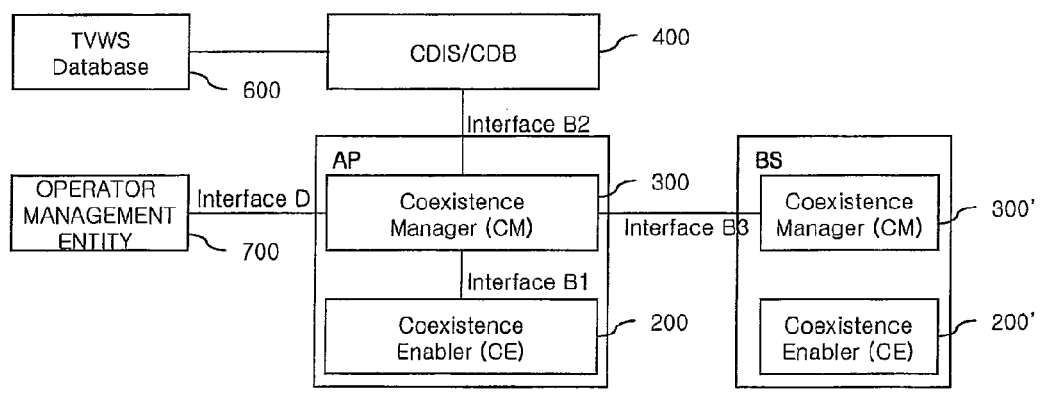
FIG. 2 is a block diagram illustrating a coexistence system according to another embodiment of the present disclosure.

FIG. 2 is a block diagram illustrating a coexistence system according to another embodiment of the present disclosure.

As can be seen with reference to FIG. 2, a CE 200 and a CM 300 may be embedded in an AP, and another CE 200' and another CM 300' may be embedded in a BS.

A CDIS/CDB 400 may be connected to a TVWS database 600. Through the connection between the CDIS/CDB 400 and the TVWS database 600, the CDIS/CDB 400 may receive TVWS information from the TVWS database 600.

Figure 3:
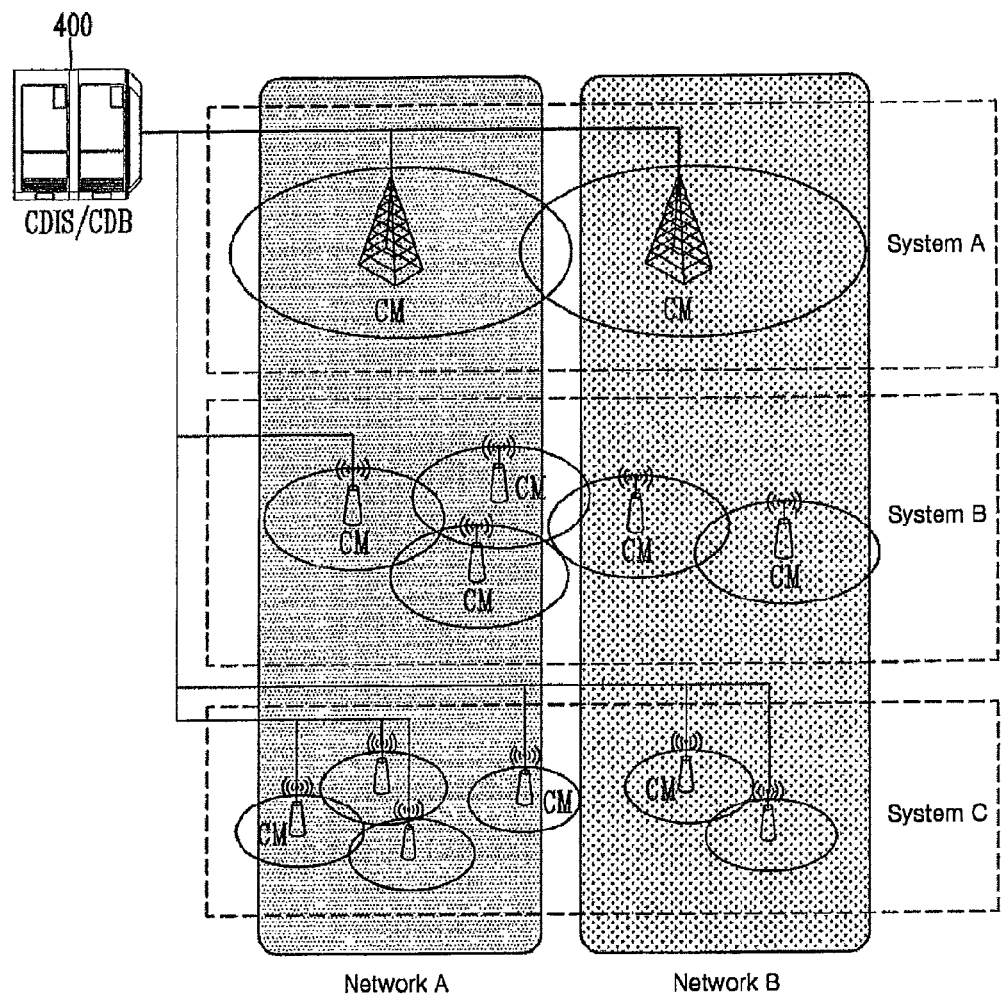
FIG. 3 illustrates an example in which a coexistence system is placed according to an embodiment of the present disclosure.

FIG. 3 illustrates an example in which a coexistence system is placed according to an embodiment of the present disclosure.

As can be seen with reference to FIG. 3, networks A and B vertically exist in the coexistent system. In addition, communication systems A, B and C horizontally exist in the coexistence system. The communication systems A, B and C use different radio access schemes, i.e., different communication schemes from one another. For example, the communication system A may be a system, for example, using cellular communication such as CDMA, GSM, CDMA-2000, WCDMA, LTE, LTE-Advanced or IEEE 802.16. The communication system B may be a cellular system having a smaller coverage than the communication system A. Alternatively, the communication system B may be the same system as Wi-Fi. The communication system C may be a cellular system, e.g., femto cell, having a smaller coverage than the communication system B. CMs exist in each of the communication systems A, B and C.

Meanwhile, the communication systems A, B and C geographically coexist within the network A, and also coexist within the network B. The CDIS/CDB 400 may generate a coexistence map and transmit the generated coexistence map to each of the CMs so that the communication systems A, B and C coexist as described above.

Figure 4:
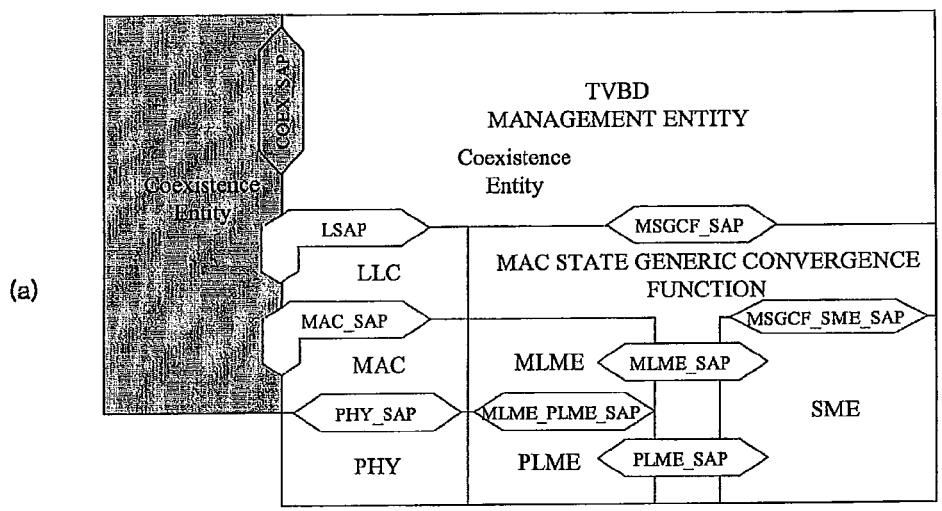
FIGS. 4A and 4B illustrate protocol stacks.
Figure 4:
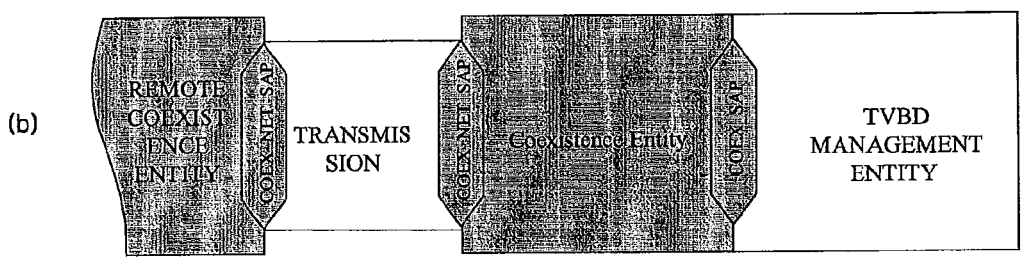

FIGS. 4A and 4B illustrate protocol stacks.

As can be seen with reference to FIGS. 4A and 4B, a coexistence entity and a TVBD management entity are shown in the protocol stack. The coexistence entity may be a CE or CM. The TVBD management entity may be a TVBD device.

The coexistence entity uses a service access point (SAP) so as to perform an interface with another entity.

COEX_SAP defines a media independent interface between the coexistence entity and the TVBD management entity.

COEX_NET_SAP defines a media dependent interface of coexistence entities providing transmission services on a data plane in a local TVBD. The COEX_NET_SAP supports coexistence information and message exchange with a remote coexistence entity.

The TVBD management entity includes a mapping function from a COEX_SAP primitive to a media dependent SAP primitive.

The TVBD management entity uses primitives defined by a MAC state generic convergence function service access point (i.e., MSGCF_SAP) or uses existing primitives defined by LSAP, so that a coexistence service for IEEE 802.11 can be performed in a data frame.

Figure 5:
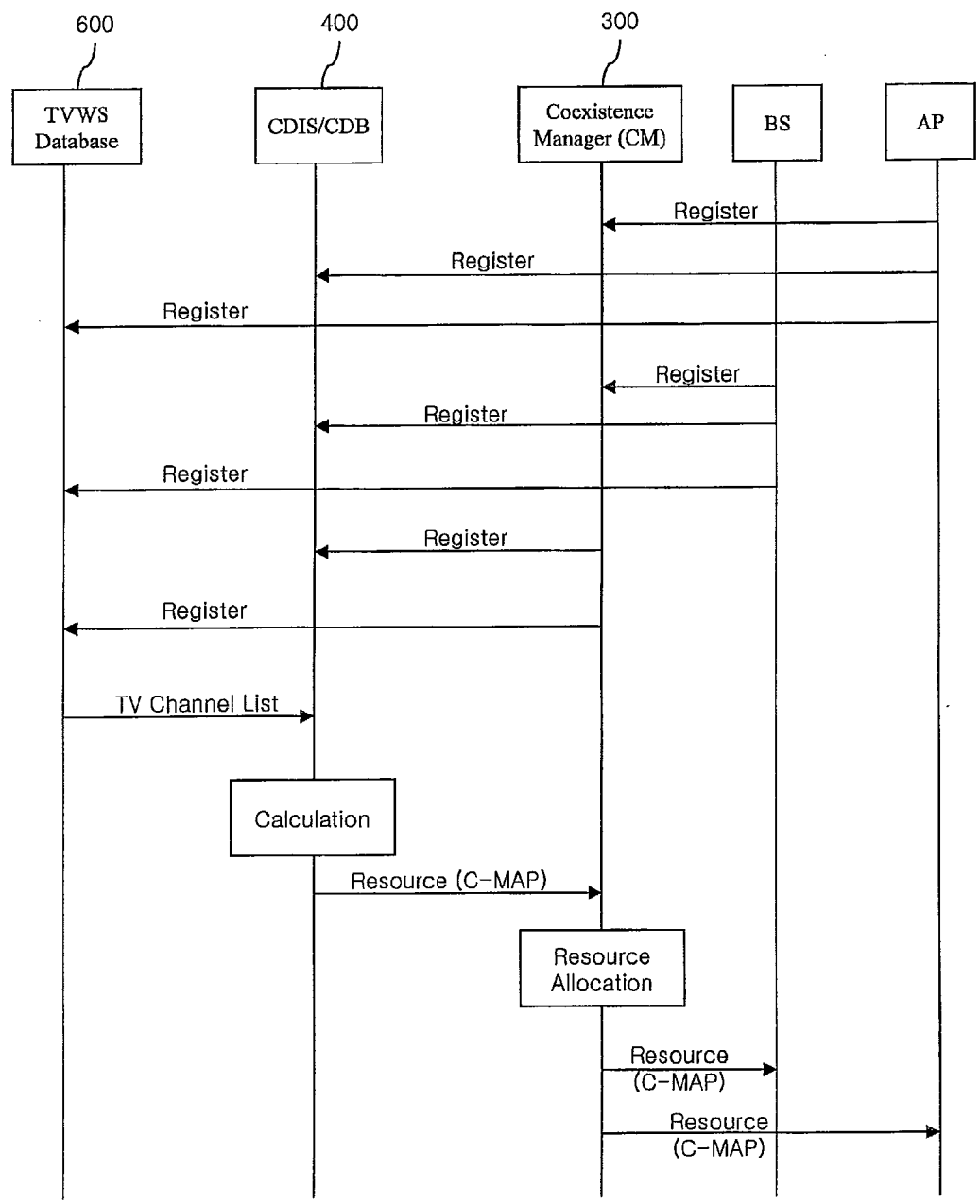
FIG. 5 illustrates an operation of a coexistence system according to an embodiment of the present disclosure.

FIG. 5 illustrates an operation of a coexistence system according to an embodiment of the present disclosure.

As can be seen with reference to FIG. 5, although the CM 300 is not embedded in an AP and a BS, this is provided for illustrative purposes, and the CM 300 may be embedded in the AP and the BS. The CE 200 may also be embedded in the AP and the BS.

Meanwhile, each of the AP and the BS performs registration to the CM 300, the CDIS/CDB 400 and the TVWS database 600.

Similarly, the CM 300 performs registration to the CDIS/CDB 400 and the TVWS database.

Meanwhile, the CDIS/CDB 400 may receive a channel list for broadcasting from the TVWS database 600. The channel list may be frequency information for broadcasting. The channel list may contain information on an operating channel and transmit power limitation.

The CDIS/CDB 400 identifies whether or not the BS and the AP coexist in an arbitrary region using location information and available channel information of the BS and the AP. In case where the BS and the AP coexist, the CDIS/CDB 400 may compute coverage radii of the AP and the BS, and allocate a channel (or resource) that the AP and the BS can use, or one or more frequency bands to different APs located in the arbitrary region, based on the channel list, i.e., the frequency information for broadcasting. Then, the CDIS/CDB 400 may generate and transmit information on the channel (or resource) or bands, e.g., a coexistence map.

Figure 6:
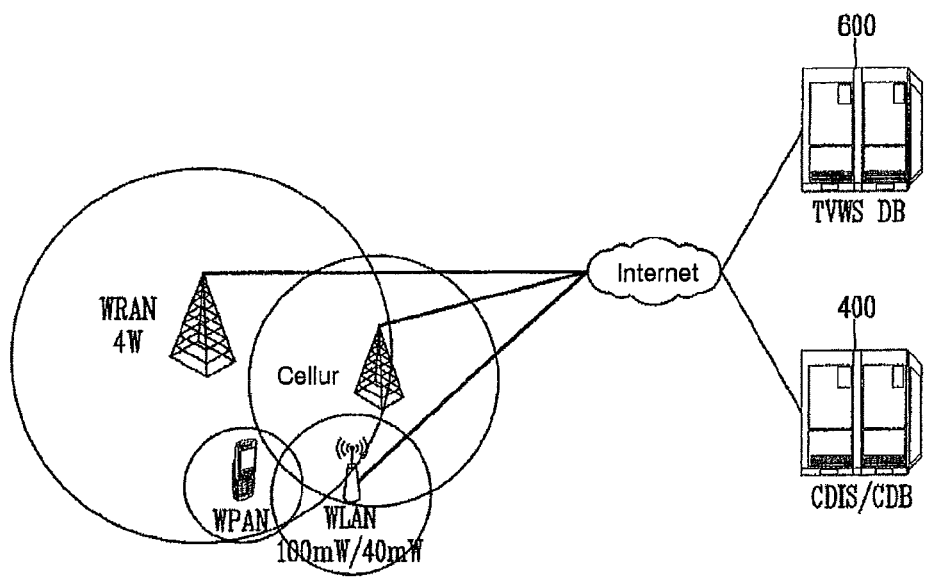
FIG. 6 illustrates another example in which a coexistence system is placed according to an embodiment of the present disclosure.

FIG. 6 illustrates another example in which a coexistence system is placed according to an embodiment of the present disclosure.

As can be seen with reference to FIG. 6, the CM or CDIS/CDB 400 may control several APs to coexist under a radio network. The APs may be connected to the CDIS/CDB 400 using physical access such as Internet.

The CDIS/CDB 400 may obtain channel information for broadcasting from the TVWS database 600 as described above. The CDIS/CDB 400 may obtain channel information for broadcasting, e.g., a broadcasting channel set in a specific geographical region. The CDIS/CDB 400 may compute a coexistence contour. Particularly, the CDIS/CDB 400 may have a neighbor detecting function on other systems operating at a frequency for TV broadcasting.

The CDIS/CDB 400 may generate a coexistence whitespace map or coexistence map as described above. The CDIS/CDB 400 may provide common clock information. The CDIS/CDB 400 may provide information for time synchronization between other systems.

The CDIS/CDB 400 may provide a parameter for the radio range and interference range of each device. The CDIS/CDB 400 may provide a parameter for the coexistence contour described above. The CDIS/CDB 400 may identify neighboring network devices for the purpose of coexistence between other systems. The CDIS/CDB 400 may provide information on transmission power of each network, the height of an antenna and another physical parameter.

Figure 7:
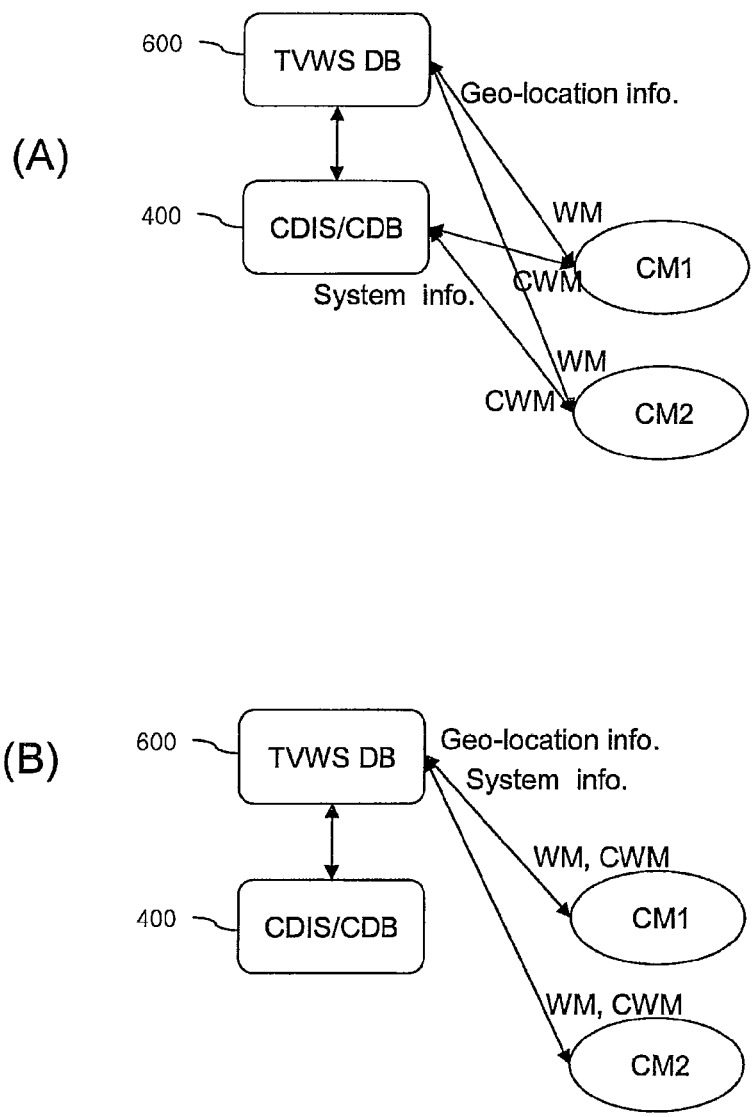
FIG. 7 is an exemplary view illustrating an operation of CDIS/CDB.

FIGS. 7(*a*) and 7(*b*) are exemplary views illustrating operations of the CDIS/CDB 400.

As can be seen with reference to FIG. 7(*a*), first and second coexistence managers CM1 and CM2 exist, and each of the first and second coexistence managers CM1 and CM2 is connected to the TVWS database 600 and the CDIS/CDB 400. The first and second coexistence managers CM1 and CM2 receive location information and frequency information for broadcasting, e.g., information on a whitespace map from the TVWS database 600. The whitespace map may mean information on an empty frequency band unused by a broadcasting provider in the VHF and UHF frequency bands allocated for TV broadcasting.

Meanwhile, the CDIS/CDB 400 is connected to the TVWS database 600, so as to receive the frequency information for broadcasting, e.g., the information on the whitespace map from the TVWS database 600. The CDIS/CDB 400, as described above, may generate the coexistence whitespace map or coexistence map, based on the frequency information for broadcasting, e.g., information on the WM. The CDIS/CDB 400 may transmit the generated coexistence whitespace map or coexistence map to the first and second coexistence managers CM1 and CM2.

As can be seen with reference to FIG. 7(*b*), the first and second coexistence managers CM1 and CM2 are connected to the TVWS database 600. The TVWS database 600 may be connected to the CDIS/CDB 400.

The CDIS/CDB 400 may transmit the coexistence whitespace map or coexistence map described above to the TVWS database 600, and the TVWS database 600 may transmit the received coexistence whitespace map or coexistence map to the first and second coexistence managers CM1 and CM2. In this case, the TVWS database 600 may transmit the received coexistence whitespace map or coexistence map as the frequency information for broadcasting, e.g., the information on the whitespace map.

Alternatively, the TVWS database 600 may transmit not only the received coexistence whitespace map or coexistence map but also the frequency information for broadcasting, e.g., the information on the whitespace map to the first and second coexistence managers CM1 and CM2. In this case, if the TVWS database 600 receives not only the received coexistence whitespace map or coexistence map but also the frequency information for broadcasting, e.g., the information on the whitespace map, the first and second coexistence managers CM1 and CM2 may select and use an appropriate one from the coexistence whitespace map or coexistence map and the frequency information for broadcasting, e.g., the information on the whitespace map.

Figure 8:
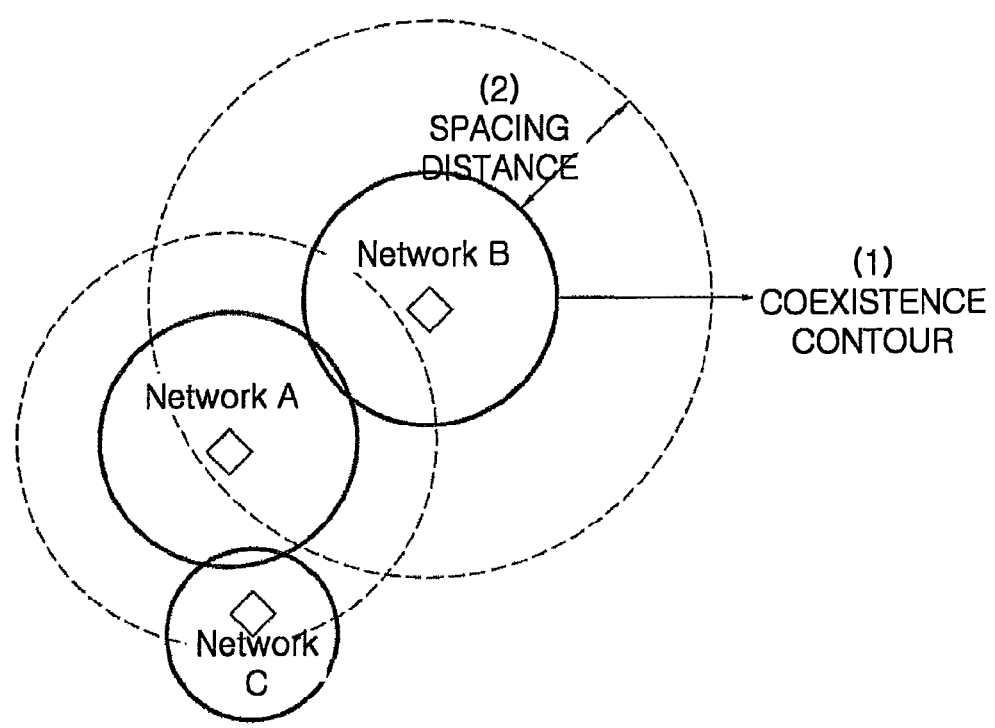
FIG. 8 is an exemplary view illustrating coexistence contours.

FIG. 8 is an exemplary view illustrating coexistence contours.

As can be seen with reference to FIG. 8, networks A, B and C exist close to one another. The coexistence contour of each of the networks is indicated by a solid line, and spacing distances between the networks are indicated by a dotted line. The coexistence contour is determined by self-characteristics of each of the networks. On the other hand, the spacing distance is determined by characteristics between the networks. As can be seen with reference to FIG. 8, the coexistence contours of the networks A and B almost come in contact with each other, and the coexistence contours of the networks A and C are partially overlapped with each other.

Figure 9:
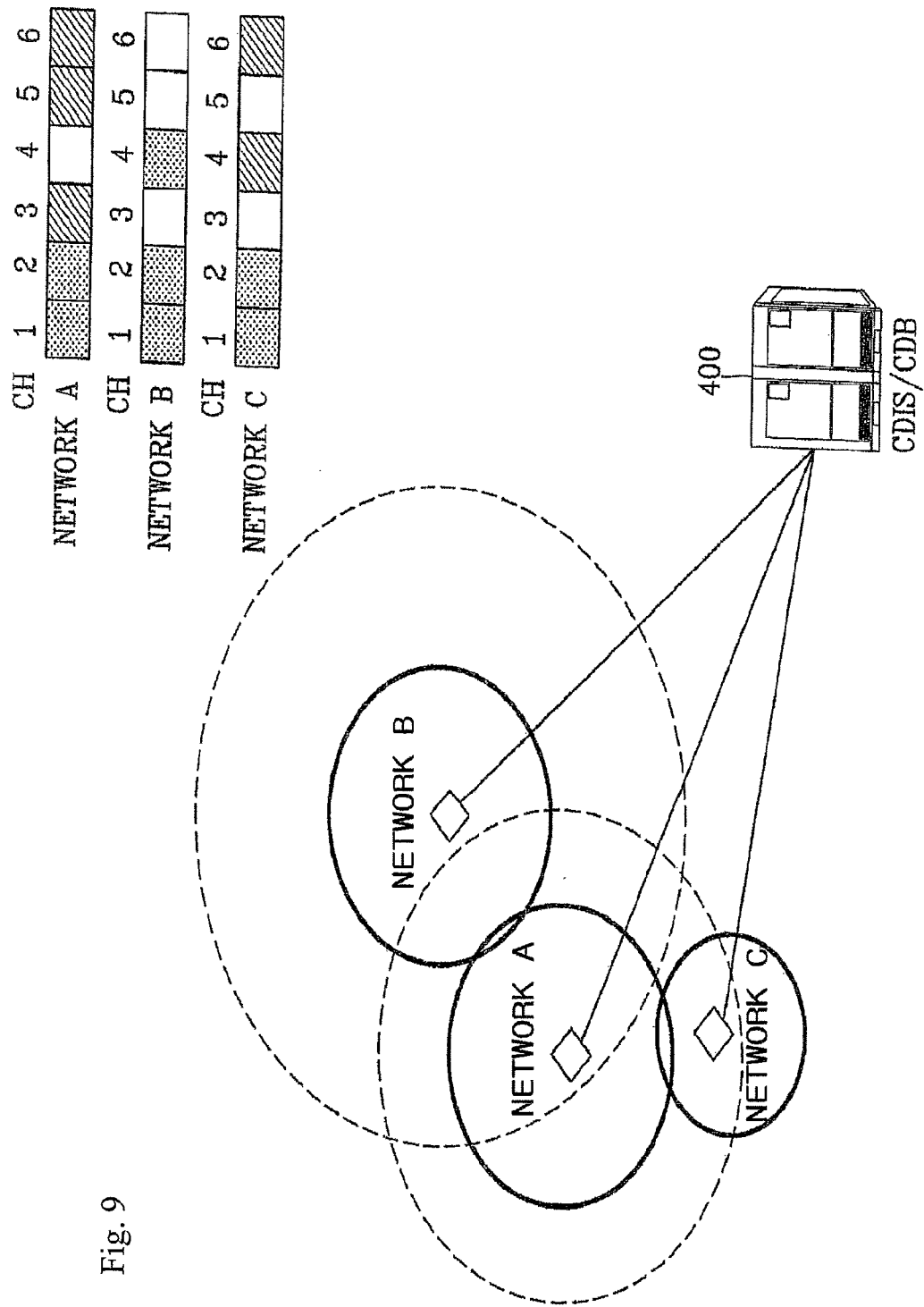
FIG. 9 illustrates an example of a coexistence whitespace map (CWM) or coexistent map in the environment of FIG. 8.

FIG. 9 illustrates an example of a coexistence whitespace map (CWM) or coexistent map in the environment of FIG. 8.

As shown in the right top of FIG. 9, it is assumed that channels 1 to 6 exist. In this case, it is assumed that the channels 1 and 2 are information for broadcasting, e.g., channels used for broadcasting according to the whitespace map.

The CDIS/CDB 400, as shown in FIG. 9, transmits, to the network A, the coexistence whitespace map or coexistence map indicating that the channel 4 is an idle channel. Accordingly, if the network A determines to use the channel 4, the CDIS/CDB 400 transmits, to the network B, the coexistence whitespace map or coexistence map indicating that the channels 3, 5 and 6 are idle channels. Accordingly, if the network B determines to use, for example, the channel 6, the CDIS/CDB 400 transmits, to the network C, the coexistence whitespace map or coexistence map indicating that the channels 3 and 5 are idle channels.

As such, the CDIS/CDB 400 transmits the coexistence whitespace map or coexistence map to each of the networks A, B and C, so that the networks A, B and C can coexist under the radio network.

Figure 10:
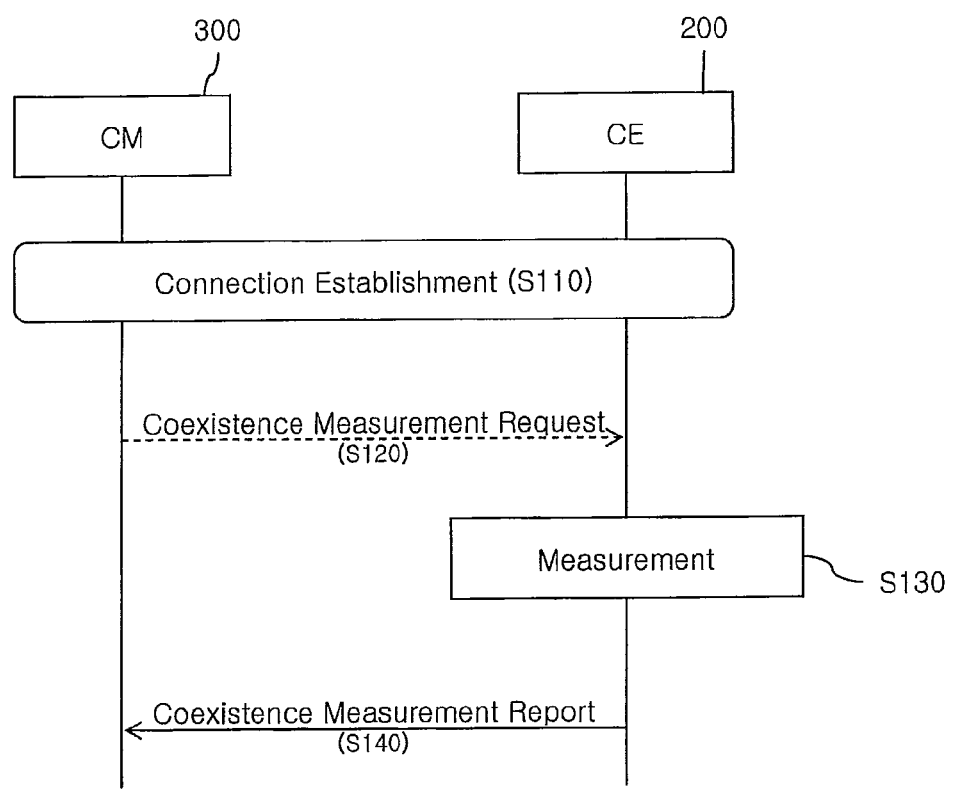
FIG. 10 is a view illustrating a process in which a coexistence manager (CM) receives information measured from a coexistence enabler (CE) according to an embodiment of the present disclosure.

FIG. 10 is a view illustrating a process in which the CM 300 receives information measured from the CE 200 according to an embodiment of the present disclosure.

In an embodiment, if the connection between the CE 200 and the CM 300 is established (e.g., the status code of coexistence peer confirmation is success) (S110), the CM 300 may request the CE 200 to perform channel measurement in a specific channel list (S120). The measurement request frame may contain a time period in which the measurement is performed on a channel to be measured so that monitoring can be performed just after the measurement is requested. The channel to be measured may be changed depending on the usage and purpose of the measurement.

The CM 300 has (maintains) an available channel list of the TVBD network or device 100, serviced by the CE 200. The available channel list refers to TV channels available at the position at which the TVBD network or device 100 is registered. The CM 300 may access the TVWS database 600 and obtain a corresponding available channel list of the TVBD network or device 100. Alternatively, the CM 300 may request the CE 200 to transmit an available channel list periodically obtained by the TVBD network or device 100 according to regulations. The measurement may be performed on both available and non-available channels of the TVBD network or device 100.

The TVBD network or device 100 may perform channel measurement so as to determine an operating channel when power is turned on or to change a current operating channel when serious quality of service (QoS) occurs in the current operating channel (or when the occurrence of the serious QoS is detected). The TVBD network or device 100 performs channel measurement in its own available channel so as to determine a (new) operating channel, and computes a channel load or QoS information, i.e., a degree of available resource in the corresponding channel.

In the coexistence system, the CM 300 determines operating channels of CEs 200 serviced by the CM 300 itself. The CM 300 arbitrarily distributes and allocates an operating channel in the TV band, or effectively allocates the operating channel using the interference relationship between the TVBD networks or devices 100 serviced by each of the CEs 200 and the available channel list. The TVBD network or device 100 serviced by the CE 200 may operate in the intersection region of the operating channel allocated to the CE 200 and the available channel. When the TVBD network or device 100 desires to move to a channel except the operating channel allocated from the CM 300 to the CE 200, the operating channel cannot be independently changed, and the allocation of the operating channel from the CM 300 must be newly changed.

The CM 300 may request the CEs 200 registered to the CM 300 itself to measure a channel load in a specific channel for a certain period of time. This is for the purpose of collecting channel information and performing efficient resource allocation because channel environment between TVBD networks or devices 100 participating in the coexistence system or withdrawing from the coexistence system and available peripheral networks, and the coexistence network are dynamically changed depending on the traffic load of the available TVBD network or device 100.

The CM 300 determines the channel number of a channel with which a channel load is to be measured and a measurement time, and transmits a measurement request message to the CE 200. In an embodiment, the measurement request format may be defined as shown in the falling Table 1.

TABLE 1

| Information Type | Length | Measurement Type | Measurement Start Time | Measurement Duration | Channel Number |
|---|---|---|---|---|---|
| Octet | 1 | 1 | 1 | 2 | 2 | Variable |

The information type means coexistence measurement, and is distinguished from another coexistence frame. The measurement type means channel load information, and is distinguished from another coexistence frame. The measurement start time means that when the time at which requested measurement is started is 0, the measurement is started immediately when a requested frame is received. The measurement duration means a measurement time period. The channel number means the channel number of a channel to be measured. For example, the channel is to be measured may be a TV channel to be measured or an operating channel of the TVBD network or device 100. In the 802.11 system, the operating channel of the TVBD network or device 100 may be represented as the combination of an operating class and a channel number.

The CE 200 receiving the measurement request measures a channel load in the TV channel indicated in the channel number field (S130), and reports the measure channel load to the CM 300. The measurement report format may be defined as shown in the following Table 2. For example, the channel to be measured may be a TV channel to be measured or an operating channel of the TVBD network or device 100.

TABLE 2

| | Information Type | Length | Measurement Type | Actual Measurement Start Time | Measurement Duration | Channel Number | Channel Load |
|---|---|---|---|---|---|---|---|
| Octet | 1 | 1 | 1 | 8 | 2 | 1 | 1 |

The Information type means coexistence measurement, and is distinguished from another coexistence frame. The measurement type means channel load information, and is distinguished from another coexistence frame. The actual measurement start time means a time at which the TVBD network or device 100 actually starts the measurement. The measurement duration means a time period in which the TVBD network or device 100 actually performs the measurement. The channel number means the channel number of a channel which the TVBD network or device 100 actually measures. In the 802.11 system, the operating channel of the TVBD network or device 100 may be represented as the combination of an operating class and a channel number.

The channel load means a channel load measured in the TV channel indicated in the channel number field. For example, in the 802.11 system, the channel load may be computed as the proportion of busy time measured in a measurement period. That is, the channel load may be computed as shown in the following Equation 1, and may have a value of 0 to 255.

$$ChannelLoad = \text{Integer}\left(\frac{ChannelUseTime}{MeasurementDuration \times 1024}\right) \times 255 \quad \text{Equation 1}$$

Here, the TVBD network or device 100 may transmit the channel load to the CM 300 without essentially receiving the measurement request of the CM 300 (using automatic measurement report). Therefore, the step S120 may be omitted.

The CE 200 performs the measurement in the requested channel. When there is no requested channel, the CE 200 performs the measurement in its own operating channel or performs the measurement in an arbitrary available channel. In this case, some of the reported channel load information may be transmitted by containing all information on the measured channels or by containing a channel to be allocated by the CE 200 in priority. The CM 300 receiving the measurement report from the CE 200 may identify the channel load information and allocate or reallocate the operating channel of the CE 200.

In an embodiment, the measurement request frame format may be defined as shown in the following Table 3.

TABLE 3

| Information Elements | Coexistence Frame Header | Information Type | Dialog Token | Measurement Request Elements |
|---|---|---|---|---|
| Octet | 8 | 1 | 1 | Variable |

The value of the information type field may be set, for example, 3 (measurement request). The measurement request elements field may contain one or more measurement request elements. In a single measurement request frame, the number and length of measurement request elements may be restricted by the maximally allowed size of a coexistence protocol data unit (CXPDU). The measurement request elements may contain the performance request of a measurement operation specified by the TVBD network or device 100.

The format of the measurement request element may be defined as shown in the following Table 4.

TABLE 4

| Information Elements | Length | Measurement Type | Measurement Request |
|---|---|---|---|
| Octet | 1 | 1 | Variable |

The field of the measurement type may be defined as shown in the following Table 5.

TABLE 5

| Measurement Type | Description |
|---|---|
| 0 | Reserved |
| 1 | TVDB Detection |
| 2 | Primary User Detection |
| 3-7 | Reserved |

The measurement type may represent TVBD detection in the measurement request element. The measurement request field corresponding to a TVBD detection element may be defined as shown in the following Table 6.

TABLE 6

| Information Elements | Measurement Start Time | Measurement Duration | TV Channel Numbers |
|---|---|---|---|
| Octet | 2 | 2 | Variable |

The measurement request element field is set to a time at which the requested measurement is started. The value of 0 represents that the requested measurement is immediately started. The measurement duration is set to duration of the requested measurement, which is expressed by time units (TUs). The TV channel numbers represent TV channel numbers to which the measurement request is applied. The channel numbers may be defined differently in countries or regions.

Meanwhile, the measurement type may represent a primary user detection request in the measurement request element. The measurement request field corresponding to a primary user detection element may be defined as shown in Table 7.

TABLE 7

| Information Elements | Measurement Start Time | Measurement Duration | Spectrum Sensing Threshold | TV Channel Numbers |
|---|---|---|---|---|
| Octet | 2 | 2 | 2 | Variable |

The measurement start time field is set to a time at which the requested measurement is started. The value of 0 represents that the requested measurement is immediately started. The measurement duration is set to duration of the requested measurement, which is expressed by TUs. The spectrum sensing threshold represents an energy detection threshold for detecting a primary user, and is expressed by dBm. The TV channel numbers represent TV channel numbers to which the measurement request is applied. The channel numbers may be defined differently in countries or regions.

The measurement report frame format may be defined as shown in the following Table 8.

TABLE 8

| Information Elements | Coexistence Frame Header | Information Type | Dialog Token | Measurement Report Elements |
|---|---|---|---|---|
| Octet | 8 | 1 | 1 | Variable |

The value of the information type may be set to 4. The measurement report elements field may contain one or more measurement report elements. In a single measurement report frame, the number and length of measurement report elements may be restricted by the maximally allowed size of the CXPDU.

The measurement report elements format may be defined as shown in the following Table 9.

TABLE 9

| Information Elements | Length | Measurement Type | Measurement Report |
|---|---|---|---|
| Octet | 1 | 1 | Variable |

The measurement type field may be defined as shown in Table 5 described above.

In the measurement request element, the measurement type may represent TVBD detection. The measurement report field corresponding to a TVBD detection element may be defined as shown in the following Table 10.

TABLE 10

| Information Elements | Actual Measurement Start Time | Measurement Duration | Measuring TVBD Address | TVBD Detection Report Subelement |
|---|---|---|---|---|
| Octet | 8 | 2 | 6 | Variable |

The actual measurement start time field is set to a time at which the TVBD measurement is started. The measurement duration is set to duration taken while the TVBD report expressed by TUs is measured. The measuring TVBD address is set to a MAC address of TVBD on which the measurement is actually performed. The TVBD detection report subelement field may be repeated.

The TVBD detection report subelement indicates the detected TVBD. The TVBD detection report subelement field may be defined as shown in the following Table 11.

TABLE 11

| Information Elements | Subelement ID | Length | Detected TVBD Address | Detected TVBD Device Type | RCPI | CE Identifier of Detected TVBD | Channel Numbers |
|---|---|---|---|---|---|---|---|
| Octet | 1 | 1 | 6 | 1 | 1 | 6 | Variable |

The detected TVBD address is set to the MAC address of the TVBD network or device 100, detected in the measured channel. The detected TVBD type field may be defined as shown in the following Table 12.

TABLE 12

| Device Type | Description |
|---|---|
| 0 | Reserved |
| 1 | Fixed Device |
| 2 | Personal/Portable Device |
| 3-7 | Reserved |

The RCPI represents received channel power as a scale of dBm. The CE identifier of the detected TVBD is set to a unique identifier of the CE 200. The CE 200 may exist in the detected TVBD network or device 100, or may exist in another TVBD network or device 100 that services the detected TVBD network or device 100. The channel number is set to the channel number of a channel on which the TVBD network or device 100 actually performs measurement. The channel number may be matched to the value of the channel numbers field of a corresponding TVBD request.

The measurement type may represent primary user detection in the measurement request element. The measurement report field corresponding to a primary user diction element may be defined as shown in the following Table 13.

TABLE 13

| Information Elements | Actual Measurement Start Time | Measurement Duration | Length | Channel Number | Primary User Type | Received Power |
|---|---|---|---|---|---|---|
| Octet | 8 | 2 | 1 | 1 | 1 | 1 |

The actual measurement start time field is set to a time at which the TVBD measurement is actually started. The measurement duration is set to duration taken while the TVBD report expressed by TUs is measured. The channel number is set to a channel number detected by an incumbent user. The channel number may be matched to the value of the channel numbers field of a corresponding TVBD request.

The primary user type field represents the detected incumbent user, and may be defined as shown in the following Table 14.

TABLE 14

| Device Type | Description |
|---|---|
| 0 | Reserved |
| 1 | TV signal |
| 2 | Low Power Auxiliary |
| 3-7 | Reserved |

The received power represents power received from the detected incumbent user as dBm.

FIG. 11(a) illustrates semantics of primitives in a coexistence measurement request according to an embodiment of the present invention.

COEX_measurement.request is used by a coexistence user so as to obtain measurement information. Parameters of the COEX_measurement.request are defined as shown in the following Table 15.

TABLE 15

| Name | Data Type | Description |
|---|---|---|
| DestinationIdentifier | COEX_ID | Identify local coexistence entity or remote coexistence entity to be destination of request |
| ChannelNumber | Integer | Specify channel number to be measure |

The COEX_measurement.request is generated by a coexistence user so as to obtain measurement information from a local coexistence entity or remote coexistence entity. When the destination of the request is the local coexistence entity itself, the local coexistence entity performs a response as COEX_measurement.confirm. When the destination of the request is the remote coexistence entity, the local coexistence entity may generate a corresponding measurement request message for the remote coexistence entity.

FIG. 11(b) illustrates semantics of primitives in coexistence measurement identification according to an embodiment of the present invention.

COEX_measurement.indication is used by the coexistence entity so as to inform the coexistence user that the measurement request message has been received from a peer coexistence entity. Parameters of the COEX_measurement.indication are defined as shown in Table 16.

TABLE 16

| Name | Data Type | Description |
|---|---|---|
| DestinationIdentifier | COEX_ID | |
| ChannelNumber | Integer | |

COEX_measurement.request is used by the coexistence entity so as to inform the coexistence user that the measurement request message has been received. If indication is received, the coexistence user performs a response as COEX_measurement.response.

FIG. 11(c) illustrates semantics of primitives in a coexistence measurement response according to an embodiment of the present invention.

COEX_measurement.response is used by the coexistence user so as to transmit local measurement information to the coexistence user performing the measurement request. Parameters of the COEX_measurement.response are defined as shown in the following Table 17.

TABLE 17

| Name | Data Type | Description |
|---|---|---|
| DestinationIdentifier | COEX_ID | Identify remote COEX entity to be destination of response |
| ResultCode | Enumeration | Report result of request |
| MeasurementReportSet | Set of measurement reports defined in each measurement report element | Set of measurement reports containing address of each detected TVBD network or device 100, identifier of CE 200 of detected TVBD network or device 100, channel number and actual measurement start time and duration |

The COEX_measurement.response is used by the coexistence user as a response of the COEX_measurement.indication. If the response is received, the coexistence entity may generate a corresponding message COEX_measurement.report and transmit the message to the destination coexistence entity.

FIG. 11(d) illustrates semantics of primitives in a coexistence measurement confirmation according to an embodiment of the present invention.

COEX_measurement.confirm is used by the coexistence entity so as to transmit measurement information to the coexistence user calling the COEX_measurement.request. Parameters of the COEX_measurement.confirm are defined as shown in the following Table 18.

TABLE 18

| Name | Data Type | Description |
|---|---|---|
| DestinationIdentifier | COEX ID | Identify caller of primitive, to be local COEX entity or remote COEX entity |
| ResultCode | Enumeration | Report result of request |
| MeasurementReportSet | Set of measurement reports defined in each measurement report element | Set of measurement reports containing address of each detected TVBD network or device 100, identifier of CE 200 of detected TVBD network or device 100, channel number and actual measurement start time and duration |

The COEX_measurement.confirm is called by the local coexistence entity so as to transmit the result of the primitive COEX_measurement.request from the previous coexistence user. If the primitive is received, the coexistence user performs an appropriate decision and performs an appropriate operation. However, if ResultsCode does not indicate "success," the coexistence user performs appropriate error handling.

Figure 12:
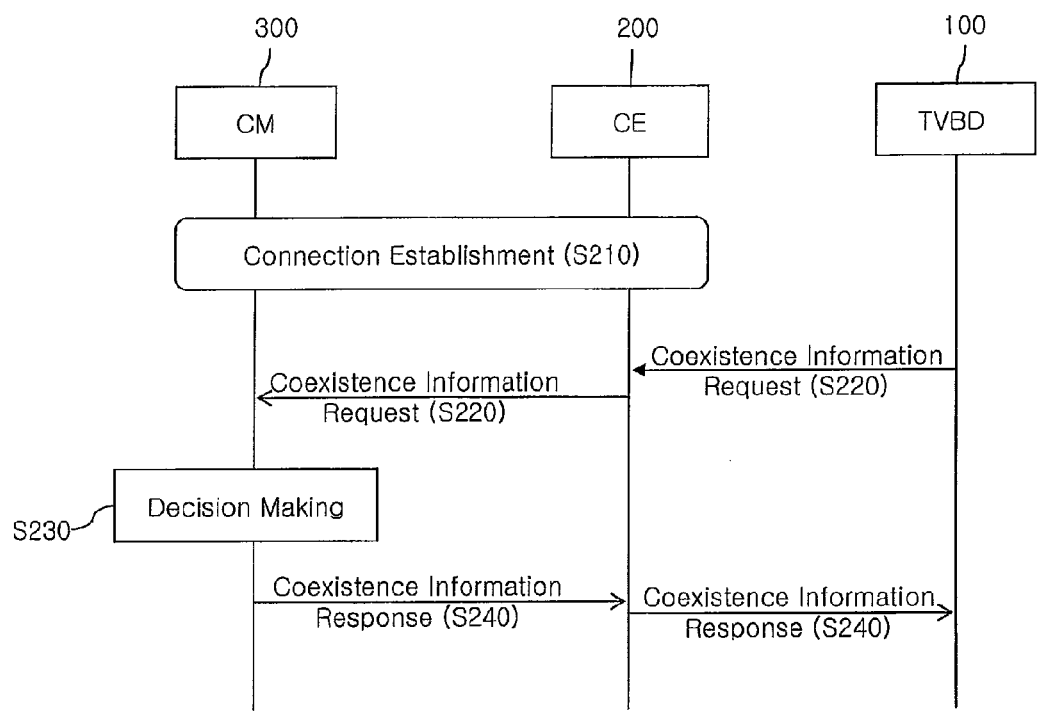
FIG. 12 is a view illustrating a process in which the CE requests the CM of coexistence information and receives the coexistence information from the CE according to another embodiment of the present invention.

FIG. 12 is a view illustrating a process in which the CE 200 requests the CM 300 of coexistence information and receives the coexistence information from the CE according to another embodiment of the present invention.

In an embodiment, if power is turned on and the connection between the CE 200 and CM 300 is established (e.g., the status code of coexistence peer confirmation is success) (S210), the TVBD network or device 100 transmits a coexistence information request message to the CE 200 after the TVBD network or device 100 is successfully registered to the CM 300 or a peripheral network environment is changed, and the CE 200 transmits the coexistence information request message to the CM 300 (S220). The coexistence information request message functions to request the CM 300 of operating channel allocation. In this case, the coexistence information request message is transmitted together with its own available channel list and the channel load of an available channel. The available channel list transmitted in the coexistence information request may be identical to the available channel list obtained by the TVBD network or device 100 from the TVWS database 600, or may be a subset of the available channel list. The coexistence information request message format may be defined as shown in the following Table 19.

TABLE 19

| | Information Type | Length | TVDB Device Type | Registered Location | Channel Number | Maximum Power Level | Channel Load |
|---|---|---|---|---|---|---|---|
| Octet | 1 | 1 | 1 | 15 | 1 | 1 | 1 |

The information type represents coexistence information, and is distinguished from another coexistence frame. The TVBD device type and registered location are information for informing the CM 300 of information of the TVBD network or device 100 serviced by the CE 200. The TVBD device type may be defined as shown in the following Table 20.

TABLE 20

| Device Type | Description |
|---|---|
| 0 | Reserved |
| 2 | Fixed Device |
| 3 | Personal/Portable Device |
| 4-7 | Reserved |

The registered location represents location information of TVBD indicated by a three-dimensional coordinate, and has a format shown in the following Table 21.

TABLE 21

| | Latitude Resolution | Latitude Fraction | Latitude Integer | Longitude Resolution | Longitude Fraction | Longitude Integer | Altitude Type | Altitude Resolution | Altitude Fraction | Altitude Integer |
|---|---|---|---|---|---|---|---|---|---|---|
| Octet | 6 | 25 | 9 | 6 | 25 | 9 | 4 | 6 | 8 | 22 |

The channel number, maximum power level and channel load fields are used to notify information on available channels of the TVBD network or device 100, and may be repeated according to the number of channels.

The channel number is a channel number indicated in an available channel list obtained from the TVWS database 600, and means a TV band available for the TVBD network or device 100. The channel number may be, for example, a TV channel number to be measured or an operating channel of the TVBD network or device 100. In the 802.11 system, the operating channel of the TVBD network or device 100 may be represented as the combination of an operating class and a channel number.

The maximum power level is the maximum transmission power corresponding to a channel indicated in the available channel list obtained from the TVWS database 600.

The channel load means a channel load measured by the TVBD network or device 100 in the TV channel indicated in the channel number field.

The CM 300 receiving the coexistence information request allocates an operating channel in consideration of the available channel number of each TVBD network or device 100, the TVBD maximum transmission power corresponding to each channel and the channel load (S230). The CM 300 transmits, to the CE 200, a coexistence information response message containing information on the operating channel allocated to each CE 200 (S240), and the CE 200 transmits the message to the TVBD network or device 100. The coexistence information response message format may be defined as shown in the following Table 22.

TABLE 22

| Information Type | Length | Channel Number | Maximum Power Level |
|---|---|---|---|
| Octet 1 | 1 | 1 | 1 |

The information type represents coexistence information, and is distinguished from another coexistence frame.

The channel number is the number of an operating channel that the CM 300 allocates to the CE 200, and the CE 200 may select a desired channel from the corresponding channel number. The operating channel may be a subset of the available channel list. The channel number may be a TV channel number to be measured or an operating channel of the TVBD network or device 100. In the 802.11 system, the operating channel of the TVBD network or device 100 may be represented as the combination of an operating class and a channel number.

The maximum power level means the maximum transmission power limited in the operating channel that the CM 300 allocates to the CE 200.

The channel load may have several forms capable of representing the resource availability of a corresponding channel. For example, the channel load may be represented as a rate of busy time or idle time measured in the measurement period of the corresponding channel, or may be represented as a throughput estimated from the interference level of another user using the corresponding channel.

When the operating channel of the TVBD network or device 100 is determined, the CM 300 obtaining the channel load identifies the channel load measured by the TVBD network or device 100 and preferentially performs channel allocation to a channel of channel load is smallest. The channel load can solve the problem of interference relationship between TVBD networks or devices 100, calculated using only the geo-location and device type (problem of obtaining a neighbor set between TVBD networks or devices), and can considerably reduce signaling and computation overhead followed when the CM 300 performs optimum operating channel allocation while managing all information containing the measurement information. The CE 200 informs the CM 300 of preference for the operating channel, based on the channel information actually measured by the TVBD network or device 100, using the channel load, so that the overhead followed when the CM 300 performs the channel allocation can be considerably reduced.

In an embodiment, the coexistence information request frame may be defined as shown in the following Table 23.

TABLE 23

| Coexistence Frame Header | Information Type | Dialog Token | Coexistence Information Request Elements |
|---|---|---|---|
| Octet 8 | 1 | 1 | Variable |

The information type field is set to 5 so as to indicate the coexistence information request frame. The format of a coexistence information request may be defined as shown in the following Table 24.

TABLE 24

| Length | Information Type | Information Request |
|---|---|---|
| Octet 1 | 1 | Variable |

The information type field may be defined as shown in the following Table 25.

TABLE 25

| Information Type | Description |
|---|---|
| 0 | Reserved |
| 1 | Operation Control |
| 2-7 | Reserved |

The information type may indicate operation control information. The information request field corresponding to an operation control information element may be defined as shown in the following Table 26.

TABLE 26

| Length | TVBD Device Type | Registered Location | Channel Number | Maximum Power Level |
|---|---|---|---|---|
| Octet 1 | 1 | 15 | 1 | 1 |

The length is a variable value set with respect to the channel number and the number of times n of repeating the maximum power level field. The number n of times n is set to the number of available channels obtained from the TVWS database 600.

The TVBD device type is set to the TVBD device type defined in Table 12 described above. The registered location field format is defined by Table 21 described above. The registered location information field contains latitude, longitude and altitude information.

The channel number is set to a TV channel number in the available channel list most recently obtained from the TVWS database 600. The maximum power level is a signed number and has a length of one octet. The maximum power level represents, as dBm, the maximum transmission power that can be transmitted on the channel indicated by the channel number field. The channel number field and the maximum power level field are repeated.

The coexistence information response frame may be defined as shown in the following Table 27.

TABLE 27

|  | Information | Information Type | Dialog Token | Coexistence Information Response Elements |
|---|---|---|---|---|
| Octet | 8 | 1 | 1 | Variable |

The information type field is set to 6 so as to indicate the coexistence information response. The format of a coexistence information response element may be defined as shown in the following Table 28.

TABLE 28

|  | Length | Information Type | Information Response |
|---|---|---|---|
| Octet | 1 | 1 | Variable |

The information type field is defined as shown in Table 25 described above.

The information type may indicate operation control information. The information response field corresponding to an operation control information element may be defined as shown in the following Table 29.

TABLE 29

|  | Length | Channel Number | Maximum Power Level |
|---|---|---|---|
| Octet | 1 | 1 | 1 |

The length is a variable value set with respect to the channel number and the number of times n of repeating the maximum power level field.

The channel number is set to the number of a TV channel on which the CE 200 can operate.

The maximum power level is a signed number and has a length of one octet. The maximum power level represents, as dBm, the maximum transmission power that can be transmitted on the channel indicated by the channel number field. The channel number field and the maximum power level field are repeated.

Figure 13:
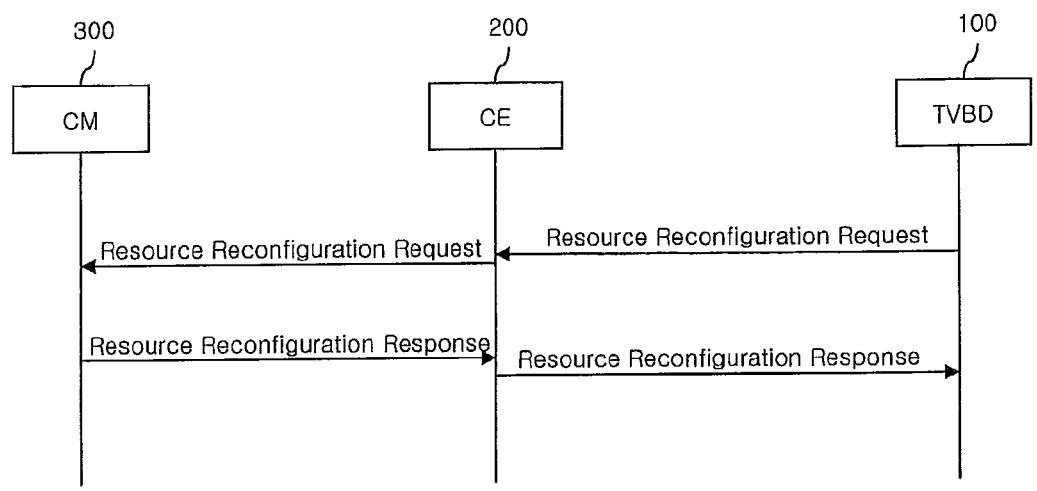
FIG. 13 is a view illustrating a resource reconfiguration procedure.

FIG. 13 is a view illustrating a resource reconfiguration procedure.

As can be seen with reference to FIG. 13, the TVBD network or device 100 transmits a resource reconfiguration message to the CE 200. The resource reconfiguration message may contain information of the TVBD network or device 100. The information may contain an available channel list.

The CE 200 may transmit the resource reconfiguration message to the CM 300. The source identifier in the resource reconfiguration message transmitted to the CM 300 is ser to the ID of the CE 200, and the destination identifier is set to the ID of the CM 300. The resource reconfiguration message may be set as shown in the following Table 30.

TABLE 30

| Information Element | Data Type | Description |
|---|---|---|
| TVBD Type | TVBD Type | TVBD Device or Network Type |
| Gelocation | GEO_LOC | Registered Location |
| Channel Number | Integer Optional | Channel Number |
| Start Freq | Real Optional | Start Frequency |
| End Freq | Real Optional | End Frequency |
| Maximum Power Level | Real | Power Limit |
| Channel Load | Real Optional | Expected Performance |

The CM 300 allocates a resource in response to the reception of the resource reconfiguration message. The CM 300 transmits, to the CE 200, a reconfiguration response message containing information on the allocated resource. The resource reconfiguration message is used to allocate the resource. The resource reconfiguration message may be set as shown in the following Table 31.

TABLE 31

| Information Element | Data Type | Description |
|---|---|---|
| Channel Number | Integer Optional | Channel Number |
| Start Freq | Real Optional | Start Frequency |
| End Freq | Real Optional | End Frequency |
| Maximum Power Level | Real | Power Limit |

The channel number contains information on the allocated resource, i.e., channel. The power limit represents the limit of power transmitted on the allocated channel.

Figure 14:
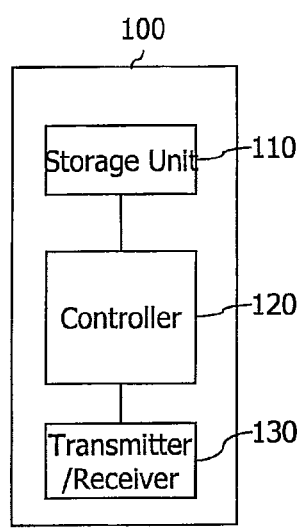
FIG. 14 is a block diagram illustrating a TVBD network or device of the present disclosure.

FIG. 14 is a block diagram illustrating the TVBD network or device 100 of the present disclosure.

As shown in FIG. 14, the TVBD network or device 100 includes a storage means 110, a controller 120 and a transmitter/receiver 130.

The storage means 110 stores the methods according to the embodiments shown in FIGS. 1 to 13.

The controller 120 controls the storage means 110 and the transmitter/receiver 130. Specifically, the controller 120 performs each of the methods stored in the storage means 110. The controller 120 transmits the signals described above through the transmitter/receiver 130.

Figure 15:
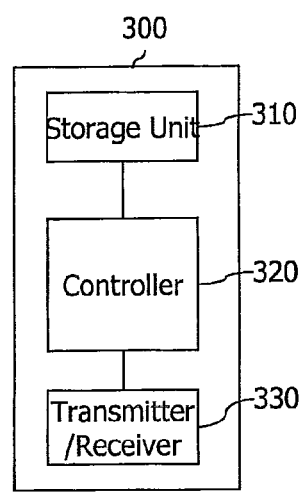
FIG. 15 is a block diagram illustrating the CM of the present disclosure.

FIG. 15 is a block diagram illustrating the CM 300 of the present disclosure.

As shown in FIG. 15, the CM 300 includes a storage means 310, a controller 320 and a transmitter/receiver 330.

The storage means 310 stores the methods according to the embodiments shown in FIGS. 1 to 13.

The controller 320 controls the storage means 310 and the transmitter/receiver 330. Specifically, the controller 320 performs each of the methods stored in the storage means 310. The controller 320 transmits the signals described above through the transmitter/receiver 330.

While the present invention has been described in connection with the embodiments, the scope of the present disclosure is not limited to the embodiments disclosed in this specification, and it will be understood by those skilled in the art that various changes and modifications can be made thereto within the technical spirit and scope defined by the appended claims.

The invention claimed is:

1. A method for receiving at least one or more allocated channels, the method comprising:

transmitting, from an apparatus including a coexistence enabler (CE) to a coexistence manager (CM), a resource reconfiguration request message, wherein the resource reconfiguration request message includes a type of at least one device using channels in television bands, channel number in the television bands, channel load, a maximum power level and information on geolocation, and wherein the type indicates whether the at least one device corresponds to a fixed device; and receiving, by the apparatus and from the CM, a resource reconfiguration response message used to allocate resources, wherein the resource reconfiguration response message includes information on channel number, start frequency, end frequency, and maximum power level.

2. The method of claim 1, further comprising:
receiving, by the apparatus, a resource reconfiguration request message from the at least one device.

3. The method of claim 2, wherein the resource reconfiguration request message received from the at least one device includes at least one of information on channel number, a maximum power level, channel load, and information on geolocation.

4. The method of claim 1, further comprising:
transmitting, by the apparatus, a resource reconfiguration response message to the at least one device.

5. The method of claim 4, wherein the transmitted resource reconfiguration response message includes at least one of information on channel number, start frequency, end frequency, and maximum power level.

6. The method of claim 1, wherein the CM performs at least one of the following steps:
generating a coexistence whitespace map;
making a decision for coexistence for the at least one device; and
exchanging information required for coexistence.

7. The method of claim 1, wherein the at least one device uses different types of network technologies.

8. A method for allocating at least one or more resource, comprising:
receiving, by an apparatus including a coexistence manager (CM) and from a coexistence enabler (CE), a resource reconfiguration request message, wherein the resource reconfiguration request message includes a type of at least one device using channels in television bands, channel number in the television bands, channel load, a maximum power level and information on geolocation, and wherein the type indicates whether the at least one device corresponds to a fixed device; and transmitting, by the apparatus to the CE, a resource reconfiguration response message used to allocate resources, wherein the resource reconfiguration response message includes information on channel number, start frequency, end frequency, and maximum power level.

9. The method of claim 8, wherein the CM performs at least one of the following steps:
generating a coexistence white space map;
making a decision for coexistence for the at least one device; and
exchanging information required for coexistence.

10. The method of claim 8, wherein the at least one device uses different types of network technologies.

11. An apparatus, comprising:
a storage unit for storing a coexistence enabler (CE);
a transmitter cooperated with the CE and configured to transmit to a coexistence manager (CM), a resource reconfiguration request message, wherein the resource reconfiguration request message includes a type of at least one device using channels in television bands, channel number in the television bands, channel load, a maximum power level and information on geolocation, and wherein the type indicates whether the at least one device corresponds to a fixed device; and a receiver configured to receive from the CM a resource reconfiguration response message used to allocate resources, wherein the resource reconfiguration response message includes information on channel number, start frequency, end frequency, and maximum power level.

12. The apparatus of claim 11, wherein the receiver is further configured to:
receive a resource reconfiguration request message from the at least one device, wherein the resource reconfiguration request message received from the at least one device includes at least one of information on channel number, a maximum power level, channel load, and information on geolocation.

13. The apparatus of claim 11, wherein the transmitter is further configured to:
transmit a resource reconfiguration response message to the at least one device, wherein the transmitted resource reconfiguration response message includes at least one of information on channel number, start frequency, end frequency, and maximum power level.

14. An apparatus, comprising:
a storage unit for storing a coexistence manager (CM);
a receiver configured to receive from a coexistence enabler (CE), a resource reconfiguration request message, wherein the resource reconfiguration request message includes a type of at least one device using channels in television bands, channel number in the television bands, channel load, a maximum power level and information on geolocation, and wherein the type indicates whether the at least one device corresponds to a fixed device; and a transceiver configured to transmit to the CE, a resource reconfiguration response message used to allocate resources, wherein the resource reconfiguration response message includes information on channel number, start frequency, end frequency, and maximum power level.

15. The apparatus of claim 14, wherein the CM performs at least one of the following steps:
generating a coexistence whitespace map;
making a decision for coexistence for the at least one device; and
exchanging information required for coexistence.

16. The method of claim 1, wherein the channel load is measured in a channel indicated by the channel number and calculated by $$ChannelLoad = Integer\left(\frac{ChannelUseTime}{MeasurementDuration \times 1024}\right) \times 255.$$

* * * * *